United States Patent [19]

Rush

[11] 4,237,866
[45] Dec. 9, 1980

[54] SOLAR HEATER

[75] Inventor: Charles K. Rush, Kingston, Canada

[73] Assignee: Queen's University at Kingston, Kingston, Canada

[21] Appl. No.: 929,747

[22] Filed: Jul. 31, 1978

[30] Foreign Application Priority Data

Aug. 19, 1977 [CA] Canada .................................. 285021

[51] Int. Cl.³ ............................................. F24J 3/02
[52] U.S. Cl. .................................. 126/433; 126/434; 126/447; 165/105
[58] Field of Search .............. 126/270, 271, 433, 434, 126/444, 446; 237/1 A; 165/156, 105, 171, 172

[56] References Cited

U.S. PATENT DOCUMENTS

| | | | |
|---|---|---|---|
| 3,390,672 | 7/1968 | Snelling | 126/271 |
| 3,875,926 | 4/1975 | Frank | 165/105 |
| 4,033,325 | 7/1977 | Walker | 126/450 |
| 4,066,062 | 1/1978 | Houston | 126/424 |
| 4,076,016 | 2/1978 | Phillips | 126/438 |
| 4,080,957 | 3/1978 | Bennett | 165/105 |
| 4,083,359 | 4/1978 | Smith | 126/433 |
| 4,098,264 | 7/1978 | Brokaw | 126/271 |
| 4,135,490 | 1/1979 | Soleau, Jr. | 126/435 |
| 4,147,154 | 4/1979 | Lewandowski | 126/271 |
| 4,167,178 | 9/1979 | Brussels | 126/450 |

Primary Examiner—James C. Yeung
Attorney, Agent, or Firm—Stanley E. Johnson; Richard J. Hicks

[57] ABSTRACT

A solar heater having a collector portion and a combined header and heat exchanger. The collector has a plurality of fluid passage means each individually in fluid communication with the chamber in the header. The plurality of fluid passages and chamber together with a condensate or fluid return passage provide a closed loop that is partially filled with a first liquid to be heated by solar energy. A conduit passes longitudinally through the chamber of the header for circulation of a second fluid to pick up heat from the first fluid. Fluid flow from the plurality of passages into the chamber is directly onto the conduit passing through the header. The plurality of fluid passages, in one instance, are provided by a plurality of conduits and, in another instance, passages are formed in two sheets of metal bonded together. The condensate or fluid return passage interconnects the chamber of the header with a cross-pipe interconnecting the plurality of passages at the lower ends thereof.

9 Claims, 8 Drawing Figures

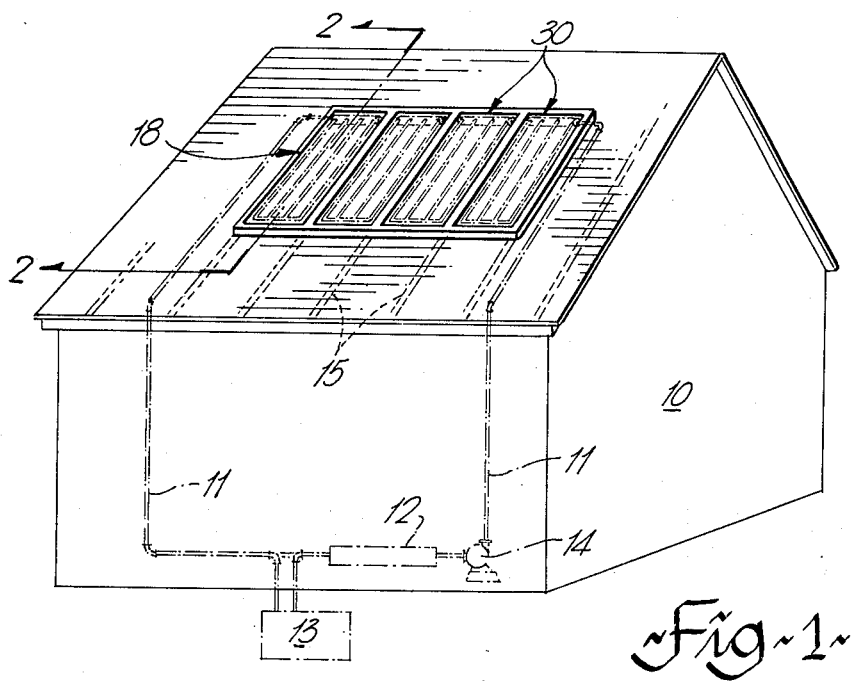
*Fig-1*
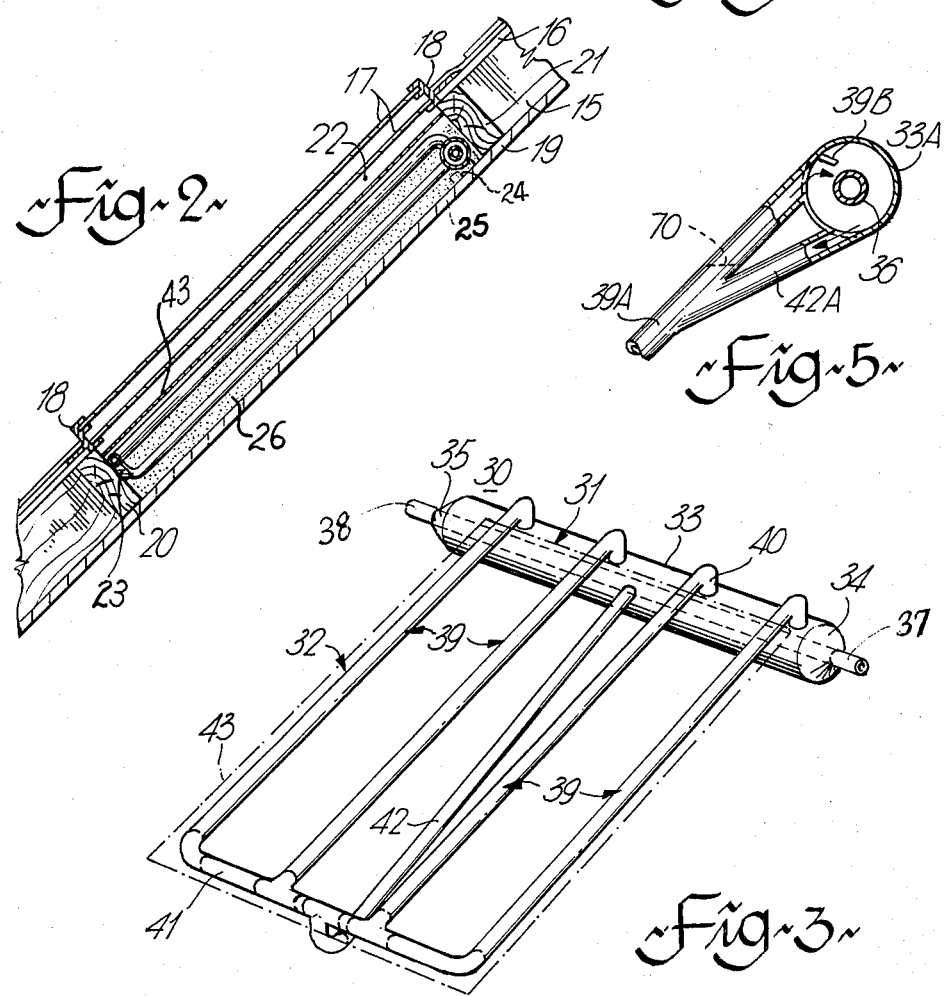
*Fig-2*
*Fig-5*
*Fig-3*

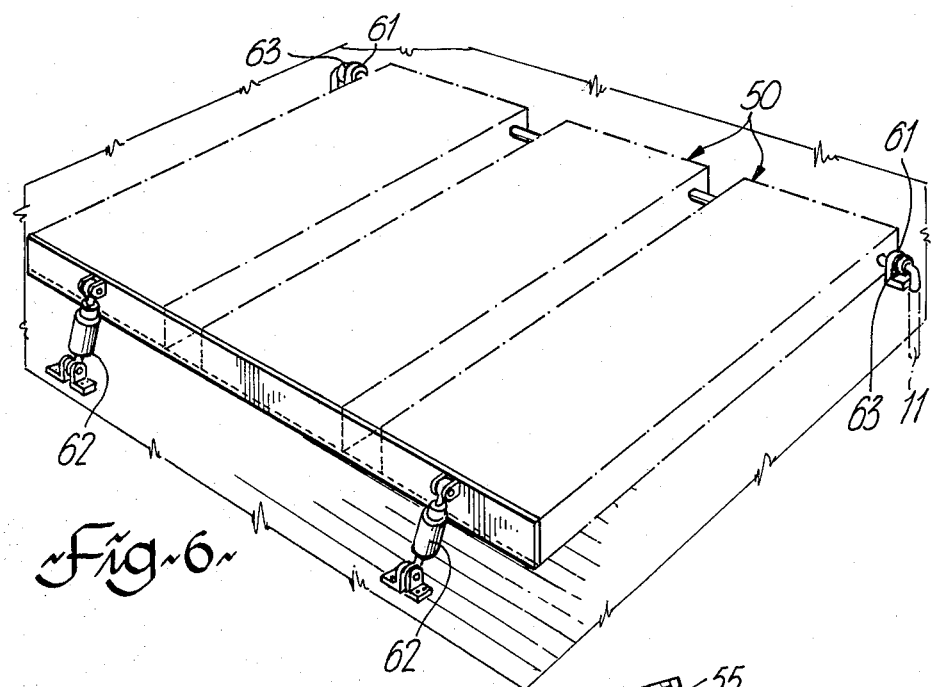
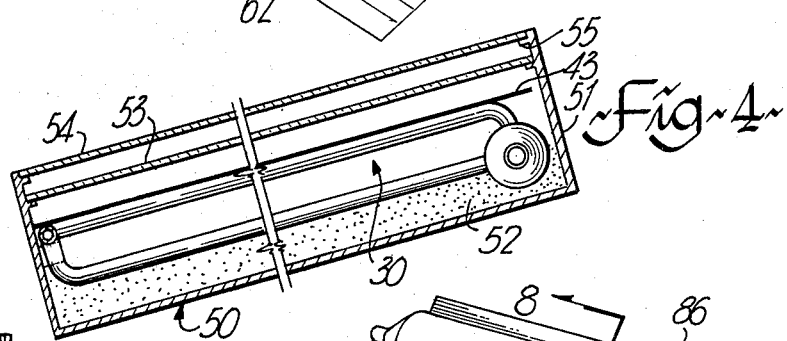
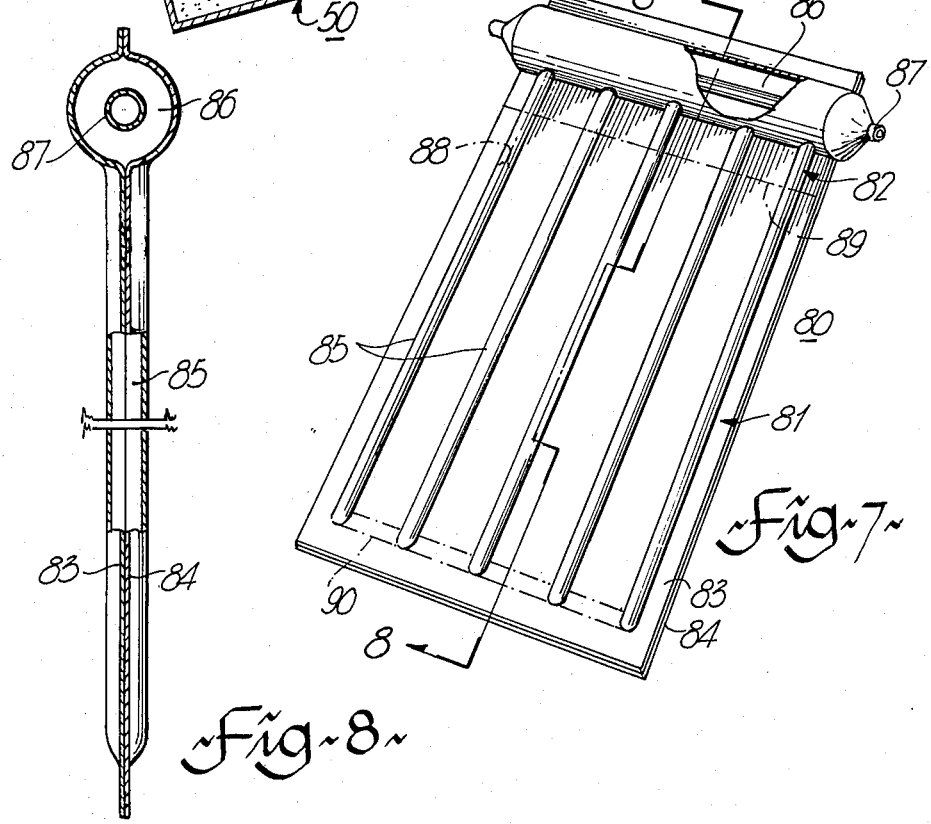

SOLAR HEATER

BACKGROUND OF THE INVENTION

This invention relates to solar heaters and to a solar heating system incorporating such heaters.

Solar heaters and heating systems incorporating the same are well known and comprise generally a solar heat collector which absorbs heat energy from the sun and transfers it, by way of a heat exchanger, into a building fluid heating system and/or heat storage unit. The heat energy transfer in some systems is in the form of sensible heat while others utilize the heat pump principle. In a system disclosed in Snelling U.S. Pat. No. 3,390,672 issued July 2, 1968, there is utilized an evacuated hermetically sealed circulating system containing a heat exchange fluid adapted to boil over a range of temperatures as long as there is a temperature difference between the temperature at the collector and the temperature at the heat exchange unit. Heat transfer in such systems relies on sensible heat as well as the latent heat of vaporization. A reference of interest with respect to the present invention is U.S. Pat. No. 4,080,957 issued Mar. 28, 1978 to C. J. Bennett.

In the present system the solar heater is a boiling-condensing type and one principal object of the present invention is to improve the efficiency of heat transfer from the solar collector to the fluid utilized in the building heating system.

A further principal object of the present invention is to provide a solar heater of novel construction facilitating and simplifying installation of the same in a building.

A further principal object of the present invention is to provide a solar heater constructed in such manner that its position may be readily varied to obtain maximum effect from the solar rays.

One of the problems associated with any condenser in a fluid system is the accumulation of deposits on the condenser unit which, over a period of time, gradually reduces the efficiency of heat transfer.

It is a further principal object of the present invention to provide a solar heater constructed in such a manner that the boiling fluid from the collector causes a scrubbing type cleaning action in the condenser.

SUMMARY OF THE INVENTION

In keeping with the foregoing objects, there is provided in accordance with one aspect of the present invention a solar heater for use in a solar heating system comprising:
(a) a collector having a plurality of fluid passage means for a fluid to be heated therein by solar energy;
(b) a heat exchanger having a chamber therein connected to said fluid passage means for direct fluid communication therewith;
(c) conduit means disposed in said chamber and having an inlet thereto and an outlet therefrom disposed exteriorly of the chamber for connection to a fluid flow circuit of a heating system;
(d) a fluid return passage means interconnecting said heat exchanger chamber and plurality of fluid passage means and all together defining a hermetically sealed closed loop path for circulation of fluid heated by solar energy; said solar heater, when installed in an operative position, having said fluid passage means inclined upwardly toward the heat exchanger and communicating with the chamber thereof at an elevation higher than the position at which the fluid return passage communicates with the heat exchanger, and the at rest liquid level in the fluid passage means.

In accordance with a further aspect of the present invention there is also provided, in a solar heating system, at least one solar heater mounted for impingement of solar rays on a surface thereof, and in such a manner along with a combined header and condenser unit, that adjustment in inclination of the heater unit is readily effected by use of jack means. The solar heater has a plurality of fluid passage means communicating with a chamber of the combined header and heat exchanger. Conduit means pass through said chamber for circulating a fluid to be heated and has respective inlet and outlet means at opposite ends of the chamber defining a pivot axis in varying the slop or tilt of the solar heater. Jack means are provided for pivoting the solar heater about such pivot axis.

In accordance with a further aspect of the present invention there is provided a method of heating a fluid using solar energy comprising:
(a) providing a plurality of fluid flow passages that each have a flow path inclined upwardly from a lower position to a higher position;
(b) providing a heat exchanger having a chamber therein disposed adjacent but at an elevation lower than said higher position;
(c) providing a fluid flow return path from a lower portion of the heat exchanger chamber to the lower position of the plurality of fluid flow passages;
(d) heating a liquid in said plurality of fluid flow passages by solar energy causing such liquid to boil;
(e) directing liquid and vapour from the same, caused by the boiling, directly onto conduit means located in the heat exchanger chamber; and
(f) circulating a fluid to be heated through said conduit means in the chamber.

BRIEF DESCRIPTION OF THE DRAWINGS

The invention is illustrated by way of example with reference to the accompanying drawings wherein:

FIG. 1 is an oblique view of a building having a solar heating system installed in accordance with one aspect of the present invention and incorporating solar heaters provided in accordance with another aspect of the invention;

FIG. 2 is a partial sectional view taken along line 2—2 of FIG. 1;

FIG. 3 is an oblique view of a solar heater provided in accordance with the present invention and for installation in new building construction and in a manner as illustrated in FIGS. 1 and 2;

FIG. 4 is a cross-sectional view of a solar heater unit incorporating a solar heater as shown in FIG. 3 and mounted on an insulated box having transparent covers;

FIG. 5 is a cross-sectional view of a portion of the solar heater illustrating a modification to the same;

FIG. 6 is a partial oblique view illustrating a further modification of where the solar heaters, constructed in accordance with the present invention, may be selectively varied in their inclination on the roof of a building;

FIG. 7 is a plan view of a modified solar heater provided in accordance with the present invention; and FIG. 8 is a side view of FIG. 7.

DESCRIPTION OF PREFERRED EMBODIMENTS

Referring now in detail to the drawings, there is illustrated in FIG. 1 a building 10 having a plurality of solar heaters 30 incorporated in the roof structure thereof and connected, by way of conduit 11, to a baseboard heating system designated generally by the reference numeral 12 and/or a heat sink or heat storage unit 13. Fluid in the heating system is circulated by way of a power driven pump unit 14 and it will be understood the building heating system and radiators thereof may be installed in any manner by anyone skilled in that trade.

The roof of the building has a plurality of parallel rafters 15 spaced, for example, 2 feet on centers and each solar heater 30 is mounted between a pair of adjacent rafters. The rafters are covered with a sheeting material 16 (for example, plywood) and shingled, openings being left therein for the respective heaters and which openings are covered by parallel, spaced apart sheets of glass 17 retained in position by aluminum moldings 18 or some other suitable framing. The underside of the rafters may be closed in, if desired, by a sheeting material, for example, gyprock panels 19. Spaced-apart headers 20 and 21 extend between adjacent rafters and these, along with the interior sheeting 19 and glass panels 17, provide cavities 22 in which the respective solar heaters 30 are located.

An individual solar heater 30 is shown in FIG. 3 and comprises a heat exchanger or condenser 31 and a collector 32. The heat exchanger 31 has a cylindrical tube or outer shell 33 closed at opposite ends by respective end caps 34 and 35 welded or otherwise conveniently secured thereto. The sleeve 33 and end caps 34 and 35 effectively provide a closed, thinwalled cylindrical vessel or chamber which is preferably insulated on the outer surface to reduce heat losses. A conduit 36, having a smaller outer diameter than the inner diameter of sleeve 33, passes coaxially through the sleeve and projects, respectively at opposite ends, in sealing relation through end caps 34 and 35. The projecting end portions of the conduit are designated respectively 37 and 38 and these provide convenient means for connecting the heat exchanger to piping of the heating system and as will become apparent hereinafter, define a pivot axis when varying the tilt or inclination of the solar heater. The space between the internal surface of the sleeve 33 and the external surface of conduit 36 is a closed chamber for circulation of a first fluid therethrough and which fluid is heated by the collector 32. Conduit 36 provides a passage for circulation of a second fluid, for example, water, air or any other suitable fluid used in the building heating system. The collector 32 comprises a plurality of conduits or evaporator tubes 39 each connected at one end, by way of an angled coupling 40, to the sleeve 33 placing the interior of the tubes 39 in fluid communication with the interior chamber of sleeve 33. The opposite ends of the conduits 39 are interconnected by way of a cross-pipe 41 and which cross-pipe is also connected to one end of one or more condensate or fluid return pipes 42. The other end of the condensate return pipes are connected to sleeve 33 so that condensate in the chamber of the latter will flow by gravity into and through condensate return pipe 42 when the solar heater is installed in its normal inclined operative position.

From the foregoing it is clearly evident the arrangement of sleeve 33 and conduit 36 provides not only a heat exchanger or condenser unit for the solar heater but also a header for the conduits or evaporator tubes 39.

Conduits 39 and/or conduit 36 and/or sleeve 33 may be copper, aluminum, or any other suitable material. In the event conduit 39 and sleeve 33 are made of aluminum and conduit 36 of copper, corrosion can result from fluid circulating in a path formed of dissimilar materials. This can be overcome by having conduit 36 pass through a tube of aluminum located internally of sleeve 33 and connected respectively at opposite ends to end caps 34 and 35. In such case the tube must be in intimate contact with the outer surface of conduit 36 for good heat transfer characteristics.

To improve the solar energy absorbing characteristics, a flat plate 43 is placed adjacent to or bonded to the evaporator tubes 39. Plate 43 may be of any material having high solar energy absorbing characteristics and, for example, may be a blackened copper plate.

The evaporator tubes 39, the chamber within sleeve 33 and condensate or fluid return tube 41 provide a closed loop path for circulation of a fluid therethrough. The entire path is a closed, hermetically sealed chamber that is partially filled with a liquid such as Freon, aqueous solutions of alcohols or glycols, ethylene ether or any other similar heat transfer fluid. The amount of liquid may, for example, occupy 50 to 75% of the total volume of the entire chamber or more. It is important however that no liquid be present in the angle couplings 40 when the heater is installed in its inclined position on the roof of a building. Preferably the liquid is a mixture of glycol and water which as will be discussed hereinafter promotes a good pumping action circulating the fluid in the closed loop path.

In an installation of the type illustrated in FIGS. 1 and 2 plate 43 need not necessarily form an integral part of the solar heater when manufactured but may be installed by workmen later during or after installation of the solar heater in the cavity 22. In such case plate 43 may be a separate element or form part of insulation inserted during construction between the interior sheeting 19 and the solar heater after the latter has been installed in place.

The embodiment shown in FIGS. 1 and 2 represents an installation in new construction where the rafters are designed to receive the solar heaters. The glass panels 17 are installed during construction. After the building has been completed except for sheeting 19, solar heaters 30 are inserted in the respective cavities provided therefor so that crosspipes 41 rest on blocking members 23 attached to headers 20. The opposite end of the solar heaters are temporarily supported so that conduit ends 37 and 38 are below the lower end of the rafter facilitating coupling conduit end portion 38 of one solar heater 30 to conduit end portion 37 of another adjacent unit by a short length of pipe. After all units have been coupled, the solar heater units are raised into position. To accommodate the coupling pipes, the rafters may be pre-notched as at 24. The solar heaters are then held in place by a strap member 25 nailed to the rafters and traversing respective ones of the notches 24 therein. It is realized notches 24 weaken the rafters and, if desired, these can be dispensed with and in place thereof holes drilled near the neutral axis of the rafters to receive the short lengths of pipe used in coupling the respective end portions 37 and 38 of two adjacent solar heaters. After the solar heaters are in position, insulation 26 is inserted and sheeting 19 then applied.

During operation, solar rays heat the liquid in the evaporator tubes 39 to a state of boiling, causing vapour and liquid to pass through couplings 49 and sputter directly onto the external surface of conduit 36 in the chamber of the heat exchanger. A fluid of lower temperature circulating through conduit 36 causes the vapour to condense on the tube and, in this way, the vapour releases its latent heat of vaporization to the fluid flowing through tube or conduit 36. The vaporization and condensation process will continue until the chamber's liquid and vapour temperature is lowered to that of the fluid flowing through the heat transfer tube 36. Sputtering the vapour directly onto the heat transfer tube 36 has been found by tests to result in not only an efficient transfer of heat to the liquid or fluid flowing through conduit 36 but also causes a scrubbing action on the external surface of conduit 36 keeping such surface clean, thereby prolonging its ability to efficiently transfer heat. With respect to the heat transfer aspect vapour rising in the boiling liquid brings with it substantial quantities of liquid that splashes against the heat transfer tube 36. The liquid returns via conduit 42 to the bottom of the collector and there results a good pumping action of the fluid circulating in the closed loop path.

The liquid lifting action of the generated vapour in the boiling liquid in the tubes is promoted by the use of fluid having low pressures at working temperature ranges. For example, a mixture of glycol and water boils at a temperature of 20° C. with an absolute pressure of a few hundreths of an atmosphere. Liquids preferred for good results are those which produce a vapour with a large specific volume at operating temperature.

In FIG. 4 there is illustrated, in cross-section, an independent solar heater unit 50 having a solar heater 30 therein as previously described with reference to FIG. 3. The solar heater 30 is contained in an open top box 51 having insulation therein as indicated at 52. The open top of the box is covered by a pair of transparent members, i.e. glass panels 53 and 54, supported on the walls of the box by blocking members 55.

A plurality of the above described solar heater units 50 are shown in FIG. 6 supported at one end on the roof 60 of an existing building by two or more bearing blocks 61 and, at the other end, by one or more variable length jack units 62. The jack units are shown as being hydraulic, but may be screwtype jacks driven by reversible electric motors or any other suitable means to effect raising and lowering the ends of the panels, pivoting the same about bearing blocks 61. The pivot axis for the units is coincident with the longitudinal axis of the axially aligned pipe end portipons 37 and 38. The end portions 37 and 38 of the two outermost solar heater units are connected, by way of rotary couplings 63, to conduit 11 of the building heating system. The jacks 62 may be actuated by suitable control means so as to automatically adjust the inclination of the solar heaters 50 for maximum absorption of the solar energy. By changing the angle of inclination of the solar units, they can vary throughout the day in relation to the position of the sun and also its different seasonal positions.

In FIG. 5 there is illustrated a modified solar heater having the same general construction as the solar heater illustrated in FIG. 3 but in place of fluid drain 42 there is provided a fluid drain tube 42A. The drain tubes 42A are connected to respective ones of the evaporator tubes 39A at a position below the normal liquid level therein designated generally by the reference numeral 70. There is also illustrated a further modification in that, in place of utilizing elbows 40 to connect the respective evaporator tubes 39 to sleeve 33, the evaporator tubes 39A are connected directly to the sleeve (designated 33A in FIG. 5) and where they discharge into the chamber, deflectors 39B are provided to direct the vapour and liquid carried therewith directly onto the external surface of conduit 36.

FIGS. 7 and 8 illustrate a modified solar heater 80 having a collector portion 81 and heat exchanger portion 82 integrally joined together. The solar heater 80 is formed from two sheets of metal 83 and 84 bonded together and having enlargments therein to provide a plurality of evaporator tubes or passages 85. Further enlargements in the respective sheets provide an elongate chamber 86 extending transversely to the length of passages 85 and in fluid communication with respective ones thereof. A conduit 87 passes through chamber 86 and serves as a path for circulating a second fluid therethrough to pick up heat from a vapour of higher temperature in the chamber 86. The passages 85 are partially filled with a liquid to a level as, for example, indicated by reference numeral 88. The remainder of such passages contains vapour of such liquid as does also the chamber 86. As seen from FIG. 8, there is no separate return passage for the condensate. Instead it flows from chamber 86 by gravity through the respective evaporator tubes 85. The condensate flow is in counterflow relation to vapour flowing into the chamber 86 when the collector 81 is heated by solar rays.

If desired, the solar heater illustrated in FIGS. 7 and 8 may be modified by bending sheets 83 and 84, for example along a crease line indicated generally by the reference numeral 89. The crease line is parallel, or substantially parallel, to the longitudinal axis of conduit 87. The bend may be such as, for example, to place the faces of the sheet on opposite sides of the crease line 89 substantially perpendicular to one another with the result evaporator tubes 85 would be connected to chamber 86 by way of an elbow equivalent to elbow 40 described with reference to FIG. 3. In such instance it would be necessary to provide a fluid drain conduit from the chamber 86 to, for example, a cross-passage 90 indicated by dotted line in FIG. 7 interconnecting the evaporator tubes 85.

The foregoing solar heater is a boiling-condensing flat plate collector and has the advantage of high heat transfer rates involved in pool boiling. Splashing liquid and condensation on the conduit passing through the header transmits the heat energy from the heat collector to a transfer fluid. The liquid and its vapour in the collector and header chamber will at all times tend to exist in a state of equilibrium. This state will be that of saturation so that the temperature and pressure of the liquid and its vapour will be dependent upon each other. Any heat addition will increase the temperature of the liquid which simultaneously produces additional vapour, thus increasing the pressure. Passing a fluid through heat transfer tube 36, which is lower in temperature than the saturated vapour, causes the vapour to condense on the tube. In this way the vapour releases its latent heat of vaporization to the fluid flowing through the tube. This process is continued until the heat addition ceases. The vaporization and condensation process will continue until the liquid and vapour temperature is lowered to that of the fluid flowing through the heat transfer tube. The heat transfer tube 36 is illustrated and described as being a straight length of pipe passing concentrically through the header provided by sleeve 33. This simplifies construction with resultant lower costs in manufacturing but obviously other arrangements may be used. For example, there may be a plurality of tubes 36 connected in parallel and/or series disposed within the chamber and having respectively an inlet and outlet disposed at opposite ends of the chamber. The inlet and outlet preferably disposed in co-axial alignment for reasons previously discussed. As previously mentioned there results a pumping action in what is effectively a closed loop path consisting of the chamber in condenser 30, fluid return conduit 42 and evaporator tubes 39. Tube 36 is preferably a finned tube and one which has been found extremely suitable is a deformed tube twisted in such a manner that fins are integrally formed therewith protruding outwardly and spirally along the outer surface thereof. The inner surface of such tube has a spiral groove running the length of the tube.

A solar heater of the present invention has several economical and technical advantages, one of which is related to corrosion. Many materials which are relatively inexpensive, such as steel or aluminum, suffer from problems of corrosion when in contact with water or other fluids. In conventional systems, when such materials are used, large quantities of corrosion inhibitors have to be used. With a boiling-condensing panel such corrosion inhibitors only need be added to the panel or solar heater fluid which comprises only a small fraction of the total liquid volume of a heating system. In this way less costly materials may be used without the need for large amounts of inhibitors.

Another advantage concerns freezing and, as with corrosion, the problem of freezing is restricted to the panel fluid. The heat exchanger is located such that it can protrude back behind the wall or roof onto which it is installed, thus eliminating the need for freeze protection of the transfer fluid. Thus, anti-freeze need only be added to the panel fluid which is a small portion of the system's total liquid volume. Freeze protection systems, such as drain down controls, can also be eliminated with the present system.

Another interesting characteristic of the boiling-condensing panel is that its opertion is not unlike that of a diode. With heat addition to the panel's blackened plate, vaporization takes place and heat is transferred to the transfer fluid. When there is no heat addition, i.e. cloudy periods, the vaporization process ceases and the heat transfer tube is surrounded by a superheated vapour. This vapour is a good insulator so that very little heat is transferred from the transfer fluid, i.e. the fluid in conduit 36, back into the collector panel. From this it will also be obvious that sensors detecting cloudy periods are not necessary because very little energy is lost during these periods with the system left in operation. The only control that is needed in the system is that of a timed on-off switch associated with the transfer fluid's circulation pump 13 for night time shut down.

Because of the construction of the solar heater, only two on-site fittings are required to connect the panels to the heating system for each solar heater, i.e. connections to conduit portions 37 and 38. Studies have shown that the inside heat transfer tube area, i.e. conduit 36, is a crucial factor in the performance and should be adequately sized. The inside tube heat transfer rate can also be increased by using roughened surfaces or strips of copper placed concentrically down the heat exchanger tubes.

I claim:
1. A solar heater for use in a solar heating system comprising:
   (a) a collector having a plurality of laterally spaced apart fluid passage means for a fluid to be heated therein by solar energy;
   (b) a heat exchanger having an elongate chamber therein extending in a direction across said passage means closely adjacent one end thereof, said fluid passage means each being individually directly connected to said heat exchanger chamber for direct fluid communication therewith;
   (c) conduit means disposed in said chamber and having an inlet thereto and an outlet therefrom disposed exteriorly of the chamber for connection to a fluid flow circuit of a heating system;
   (d) a fluid return passage means interconnecting said heat exchanger chamber and plurality of fluid passage means and all together defining a hermetically sealed closed loop path for circulation of fluid heated by solar energy; said solar heater, when installed in an operative position, having said fluid passage means inclined upwardly toward the heat exchanger and communicating with the chamber thereof at an elevation higher than the position at which the fluid return passage communicates with the heat exchanger, and the at rest liquid level in the fluid passage means; and
   (e) means directing fluid flowing from respective ones of said plurality of passage means into said chamber directly onto the outer surface of said conduit means, the arrangement being such that boiling of liquid in the passages, resulting from solar heating, causes pumping of the fluid around the closed loop path and wherein the fluid pumped into said heat exchanger is a two phase mixture of liquid and vapour.

2. A solar heater as defined in claim 1 including a solar energy absorbing member associated with said plurality of fluid passage means.

3. A solar heater as defined in claim 1 wherein said conduit means inlet and outlet are disposed in co-axial alignment.

4. A solar heater as defined in claim 1 wherein said heat exchanger comprises an elongate sleeve closed at opposite ends thereof, wherein said conduit means comprises at least one conduit passing longitudinally through said sleeve and wherein the respective fluid passage means are each connected to the chamber by a downwardly curved passage, said curved passages providing said means for directing fluid from the plurality of passages directly onto the conduit means in the chamber of the heat exchanger.

5. A solar heater as defined in claim 4 wherein said sleeve is cylindrical.

6. A solar heater as defined in claim 1 wherein said plurality of passage means are disposed in a plane offset from the heat exchanger, wherein the heat exchanger has an elongate chamber disposed substantially parallel to said plane and wherein the plurality of passage means are connected to an upper portion of the chamber of the heat exchanger by way of respective ones of a plurality of downwardly curved passage means.

7. A solar heater comprising:
   (a) a plurality of laterally spaced apart passage means disposed substantially in a common plane;
   (b) an elongate heat exchanger offset downwardly from said plane and disposed substantially parallel thereto closely adjacent one end of said passage means; said heat exchanger having an enclosed chamber with conduit means therein for circulation of a fluid therethrough;

(c) downwardly curved passage means connecting respective ones of the plurality of passage means individually to the chamber of the heat exchanger above said conduit means whereby fluid sputtering from the plurality of passage means is directed onto said conduit means at positions spaced apart from one another longitudinally along the conduit means; and (d) a fluid flow return passage means from said heat exchanger chamber to said plurality of passage means; said plurality of passage means, heat exchanger chamber and fluid flow return passage means defining a closed loop path for the circulation of fluid and the arrangement being such that liquid in the plurality of passage means boils when heated by solar energy sputtering liquid and vapour directly onto said conduit means disposed in the heat exchanger.

8. A solar heater comprising:

(a) one or more fluid flow passages extending in a common plane from a first position to a second position spaced apart from one another;

(b) a heat exchanger disposed closely adjacent said second position and having an elongate chamber therein with at least a major portion thereof offset downwardly from said common plane;

(c) conduit means disposed in said major portion of said chamber and having an inlet and outlet for circulating a fluid therethrough in non-communication with such chamber and adapted for connection to a fluid flow circuit of a heating system;

(d) passage means connecting each of said fluid flow passages individually directly with said chamber at a position above said conduit means via openings having a cross-sectional area substantially smaller than the volume of said chamber, said openings being spaced apart from one another longitudinally along the chamber; and (e) fluid flow return passage means connecting a lowermost portion of said chamber with said fluid flow passage means adjacent said first position, said fluid flow passages, fluid flow return passage means and heat exchanger chamber defining a closed loop path for the circulation of fluid therein heated by solar energy the arrangement being such that boiling of liquid in the passages, resulting from solar heating, causes pumping of the fluid around the closed loop path and wherein the fluid pumped into said heat exchanger is a two phrase mixture of liquid and vapour.

9. A method of heating a fluid using solar energy comprising:

(a) providing a plurality of fluid flow passages that each have a flow path inclined upwardly from a lower position to a higher position;

(b) providing a heat exchanger having a chamber therein disposed closely adjacent but at an elevation lower than said higher position;

(c) providing a fluid flow return path from a lower portion of the heat exchanger chamber to the lower position of the plurality of fluid flow passages;

(d) heating a liquid in said plurality of fluid flow passages by solar energy causing such liquid to boil and thereby effect a pumping action;

(e) directing liquid and vapour from respective ones of the passages as it is being pumped directly onto conduit means located in the heat exchange chamber ; and (f) circulating a fluid to be heated through said conduit means in the chamber.

* * * * *